United States Patent [19]

Tsuyama

[11] Patent Number: 5,311,368
[45] Date of Patent: May 10, 1994

[54] MIRROR DRIVE UNIT

[75] Inventor: Osamu Tsuyama, Hiratsuka, Japan

[73] Assignee: Ichikoh Industries, Ltd., Tokyo, Japan

[21] Appl. No.: 983,230

[22] Filed: Nov. 30, 1992

[30] Foreign Application Priority Data

Nov. 28, 1991 [JP] Japan .................................. 3-314490

[51] Int. Cl.$^5$ ............................................. G02B 7/182
[52] U.S. Cl. ..................................... 359/874; 359/872; 359/876; 359/877; 74/502.1
[58] Field of Search ............... 359/872, 874, 876, 877; 439/34; 74/502.1

[56] References Cited

U.S. PATENT DOCUMENTS

| | | | |
|---|---|---|---|
| 3,574,286 | 4/1971 | Ritchie . | |
| 4,815,837 | 3/1989 | Kikuchi et al. | 359/877 |
| 4,915,493 | 4/1990 | Fisher et al. | 359/877 |
| 4,930,370 | 6/1990 | Yoshida | 74/502.1 |

FOREIGN PATENT DOCUMENTS 204845 12/1986 Japan .

*Primary Examiner*—Loha Ben
*Assistant Examiner*—Thomas D. Robbins
*Attorney, Agent, or Firm*—Foley & Lardner

[57] ABSTRACT

Lead terminals of a plurality of motors disposed inside a drive unit casing are lead out through a plurality of elongated through-holes formed in the casing and connected to a plurality of power-supply sheathed wires by connecting terminals. A plurality of elongated concavities is formed adjoining to the corresponding through-holes on the outer surface of the casing. With the connecting terminals connected to the plurality of sheathed wires, the plurality of lead terminals extended from the motor are bent through a nearly right angle at the open ends of the through-holes along the outer surface of the casing and the connecting terminals are forcibly fitted on the side walls of the elongated concavities. Therefore, the electrical connection between the lead terminals extended from the plurality of motors and the plurality of power-supply sheathed wires needs no soldering. The sheathed wires can be very easily connected to the lead terminals of the motors and they can not be easily disconnected from the lead terminals.

3 Claims, 5 Drawing Sheets

MIRROR DRIVE UNIT

BACKGROUND OF THE INVENTION a) Field of the Invention

The present invention relates to a mirror drive unit for tilting a mirror pivotably supported in a mirror housing. In particular, it relates to an improved structure for an electrical connection from a battery to a plurality of mirror-tilting motors housed in a power unit fixed in the mirror housing.

b) Statement of Related Art

In an electrically remote-controlled mirror assembly, a pair of motors for driving a mirror about the horizontal and vertical axes, respectively, thereof is housed in a power unit and the mirror is fixed to a mirror holder and tiltably supported on a ball-and-socket joint provided outside the power unit. The power unit supporting the mirror is housed in a mirror housing forming the profile of the remote-controlled mirror assembly. A pair of plungers or threaded rods to tilt the mirror about the horizontal and vertical axes, respectively, is disposed for a reciprocal movement in relation to the power unit. The forward or reverse revolution of each motor is converted into a forward or backward movement of each plunger through a corresponding reduction gear train, whereby the mirror is tilted about the horizontal and vertical axes, respectively, thereof. The pair of motors which drive the mirror is supplied with power from a battery through a control circuit having a control switch. Generally, the motors and control switch are electrically connected to each other through a plurality of sheathed wires extended from the control switch and of which the ends are introduced into the power unit through through-holes formed in the latter and soldered directly to the output terminals of each motor or soldered to the electrically conductive plates connected to the output terminals. This structure of electrical connection is disadvantageous because soldering is required, which adds to the number of assembling steps.

To overcome such disadvantages, a structure of electrical connection using sockets and connectors has been proposed in which a plurality of conductor pieces electrically connected to the terminals of each motor in the power unit is formed integrally with the power unit to form a socket of which the one end is exposed outside the power unit and in which the ends of a plurality of sheathed wires extended from a control circuit are connected to one connector. Such conventional structures of electrical connection are known from the disclosures in the Japanese Unexamined Utility Model Publication No. 61-204845 and U.S. Pat. No. 4,930,370. However, this structure of electrical connection is disadvantageous in that the connector is easily disconnectable from the socket and that the freedom in design of the mirror housing in which the power unit is provided is limited since the socket protrudes out of the power unit.

SUMMARY OF THE INVENTION

An object of the present invention is to provide a mirror drive unit having an electrical-connection structure in which a plurality of sheathed wires for power supply from a battery to the motors cannot be easily disconnected from the power unit and the mirror housing is not limited in freedom of design.

Another object of the present invention is to provide a mirror drive unit having a structure of electrical connection which needs no soldering and can be easily assembled.

The above objects are accomplished by providing a mirror drive unit comprising, according to the present invention, a plurality of motors to tilt a mirror supported pivotably inside a mirror housing about the horizontal and vertical axes thereof, a synthetic resin-made power unit housing the motors hermetically, and a harness including a plurality of wires to supply electric power to the plurality of motors in the power unit, the power unit having formed therein a plurality of small through-holes through which the lead terminals of the plurality of motors can be led out from inside to outside thereof and also having a plurality of small concavities, corresponding to the through-holes, formed on the outer surface thereof adjoining the through-holes, one end of each of the lead terminals of the plurality of motors, respectively, being exposed outside the through-hole and bent through a nearly right angle at the open end of the through-hole so as to be received in the concavity, a plurality of connecting terminals being provided to grip the exposed ends of the plurality of lead terminals and the plurality of wires in the harness for electrical contact with each other and forcibly fitted on the side walls of the concavities.

Each of the sheathed wires should preferably be connected to each of the connecting terminals. First, each lead terminal is passed through the corresponding through-hole, namely, each lead terminal is led out from inside to outside of the power unit, and then each of the connecting terminals is connected to each of the lead terminals. Thereafter, each lead terminal is bent at a nearly right angle together with each of the sheathed wires and each of the connecting terminals toward the elongated concavity, and each connecting terminal is forcibly fitted and thus securely fixed on the inner walls of the concavity.

In the above arrangement, one end of each of the lead terminals of the plurality of motors and the plurality of sheathed wires are securely gripped or secured in each of the connecting terminals and the connecting terminal is forcibly fitted in the inner walls of the concavity, so that both cannot easily be disengaged from each other. Further, they are easily assembled without the necessity of soldering. The connecting terminals which securely connect the exposed ends and wires in a mechanical manner are covered with an adhesive tape, whereby the harness can be more securely fixed on the power unit.

DETAILED DESCRIPTION OF THE PREFERRED EMBODIMENT

The present invention will be better understood from the ensuing description made, by way of example, of an embodiment of the mirror drive unit according to the present invention with reference to the drawings.

Figure 1:
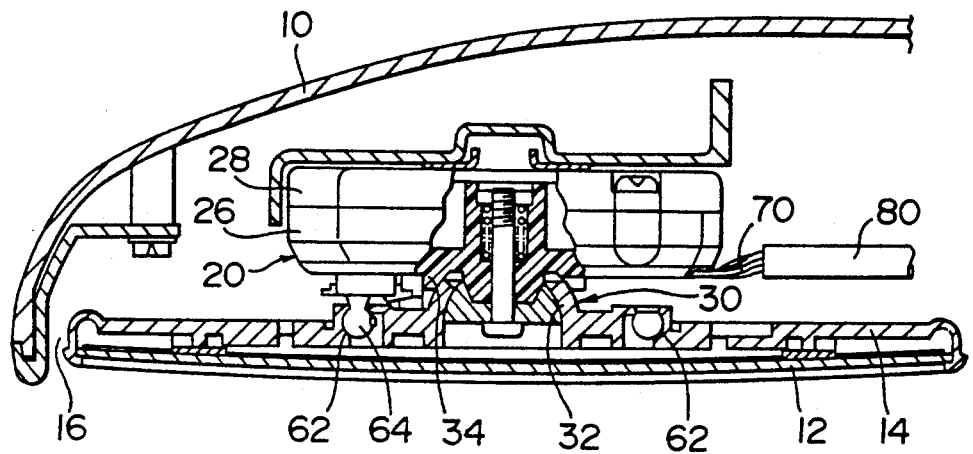
FIG. 1 is a sectional view showing a side mirror as a whole including the mirror drive unit according to the present invention.
Figure 2:
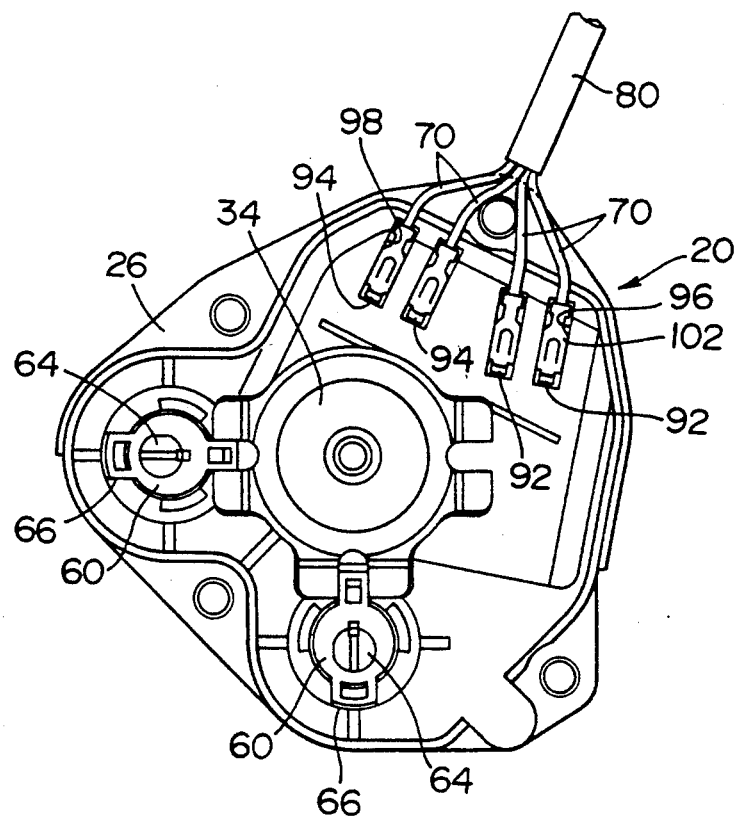
FIG. 2 is a plan view of the mirror drive unit shown in FIG. 1.

FIG. 1 shows an embodiment of the mirror drive unit according to the present invention applied to a side mirror. The mirror drive unit has a mirror housing 10 mounted on a mirror base (not shown) fixed to the door of a car. A mirror 12 is fixed to a mirror holder 14 and covers an opening 16 of the mirror housing 10. The reference numeral 20 denotes a mirror drive unit, that is, a power unit, disposed within the mirror housing 10 and adopted to tilt the mirror holder 14 about the horizontal and vertical axes thereof under the remote control from the driver's seat.

The mirror holder 14 is supported pivotably by the power unit 20. The power unit 20 comprises two synthetic resin-made casings, upper and lower, 26 and 28, formed so as to be hermetically fitted to each other and house two motors 22 and 24. The mirror holder 14 is supported by a ball-and-socket joint 30 comprising a hollow hemispheric portion 32 formed nearly in the middle of the rear side of the mirror holder 14 and a hemispheric seat 34 formed on the upper casing 26 opposite to the hemispheric portion 32. Such a ball-and-socket joint per se is well known.

Figure 3:
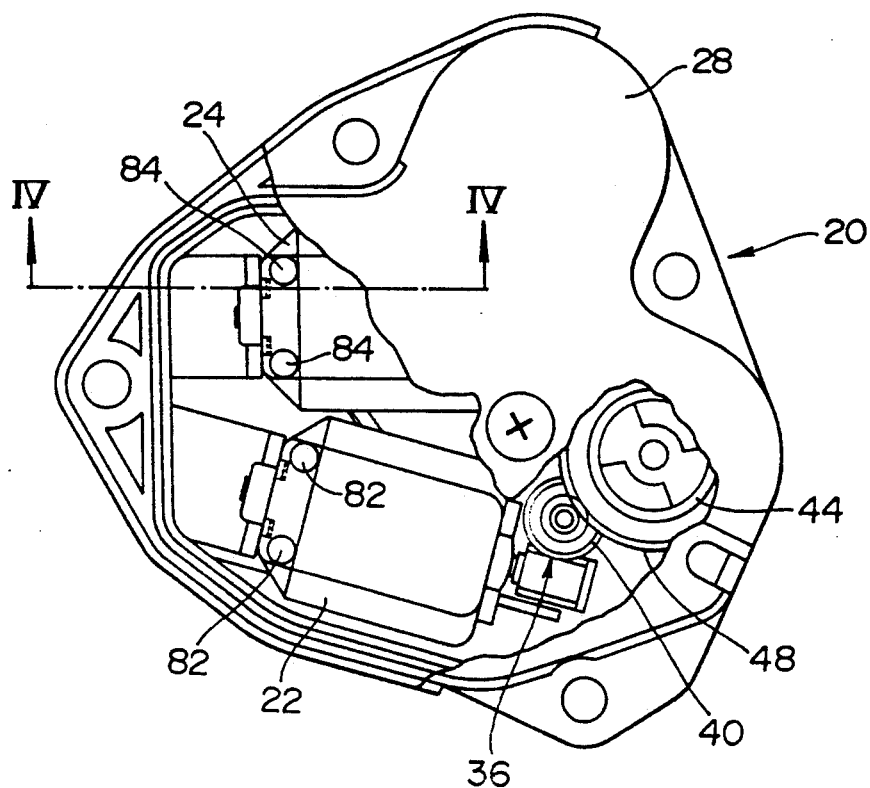
FIG. 3 is a partially fragmentary bottom view of the mirror drive unit in FIG. 2, showing two motors disposed in the power unit.

As shown in FIG. 3, the revolution of each of the two motors 22 and 24 housed in the power unit 20 is transmitted to a cylindrical driving member 44 via a last gear 40 of a reduction gear train 36 including a worm fixed to the output shaft of the motor. The cylindrical driving member 44 has provided on the outer circumference thereof a gear 48 which is in mesh with the last gear 40 of the reduction gear train 36, and also has formed integrally on the axis thereof a shaft member (not shown) having a pair of resilient engagement pieces (not shown) threaded at the end portion thereof. The reference numeral 60 indicates a pair of operating members, that is, plungers, provided to tilt the mirror holder 14 vertically and horizontally about the ball-and-socket joint 30. Each of the plungers 60 has formed at the end thereof a ball 64 which is fitted in a spheric seat 62 formed on the rear side of the mirror holder 14, and also has a cylindrical portion which can be inserted into the cylindrical portion of the cylindrical driving member 44. The cylindrical portion of the plunger 60 has formed on the inner circumferential wall thereof a thread (not shown) in which the outer thread of the resilient engagement piece of the cylindrical driving member 44 is engaged. The plunger 60 is blocked against any rotation relative to upper casing 26 of the power unit 20 in such a manner that it can be moved forward and backward over a predetermined distance through an opening 66 formed in the upper casing 26 of the power unit 20.

Therefore, as the motor 22 or 24 revolves forward or backward, the last gear 40 rotates and thus the cylindrical driving member 44 rotates along with the pair of resilient engagement pieces. The plunger 60 will move forward and backward in the axial direction since it has an inner thread which is in mesh with the outer thread on the pair of resilient engagement pieces of the cylindrical driving member 44 and also it is blocked against any rotation relative to the power unit 20. Thus, the mirror holder 14, namely, the mirror, will be tilted about the horizontal and vertical axes.

In an embodiment in which the mirror drive unit according to the present invention is applied to a side mirror, power is supplied to the two motors 22 and 24 from a battery (not shown) via a control switch (not shown) through four sheathed wires 70 which are bound together to form a harness. The structure of electrical connection to the motors will be described in detail below.

Figure 5:
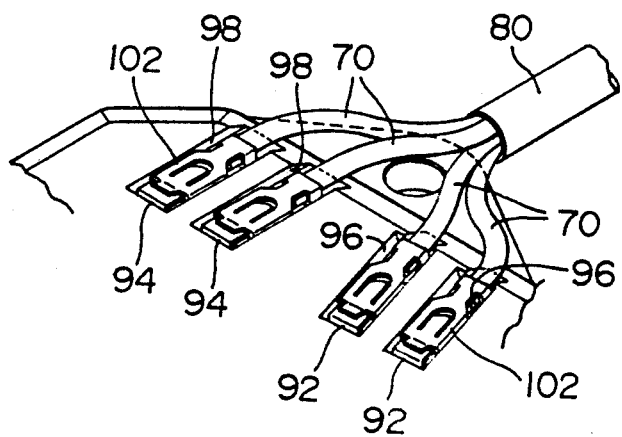
FIG. 5 is an enlarged-in-scale perspective view showing major parts of the mirror drive unit according to the present invention.
Figure 4:
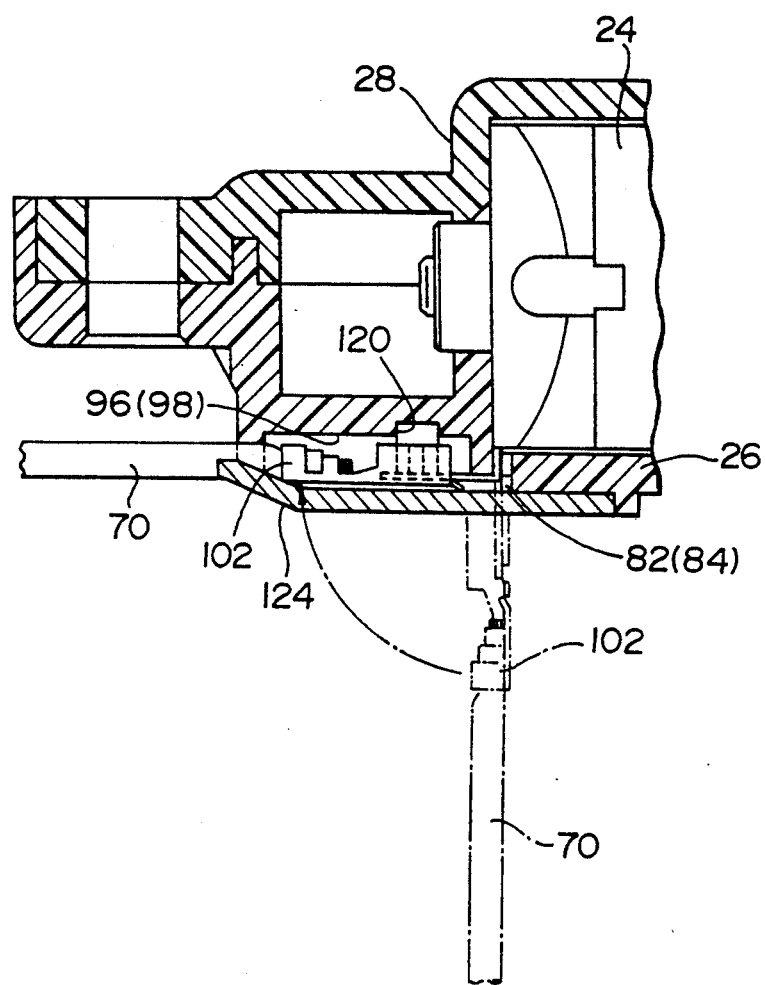
FIG. 4 is an enlarged-in-scale sectional view taken along the line IV—IV in FIG. 3.

A pair of lead terminals 82 of the motor 22 and a pair of lead terminals 84 of the motor 24 are led to outside the power unit 20 through elongated through-holes 92 and 94, respectively, formed in the upper casing 26 as shown in FIG. 5. These lead terminals 82 and 84 are shown each with a small circle on a side facing the lower casing in FIG. 3 for the simplicity of illustration, but they are disposed on a side facing the upper casing 26 in practice. These four lead terminals are electrically connected to the conductors of four sheathed wires 70 by connecting terminals 102, respectively. As shown in FIG. 4, the lead terminals 82, 84 of the motors 22, 24 extend directly from the motors 22, 24 in a direction substantially perpendicular to the upper casing 26.

The upper casing 26 has formed on the outer surface, adjoining the open end of each through-hole, pairs of elongated concavities 96 and 98 corresponding to the pairs of lead terminals 82 and 84, respectively. Free end portions of the lead terminals from the motors are connected to the sheathed wires by the connecting terminals 102, respectively, and bent at the open ends of the through-holes. The connecting terminals 102 are forcibly fitted on the inner walls of the corresponding concavities.

Figure 6:
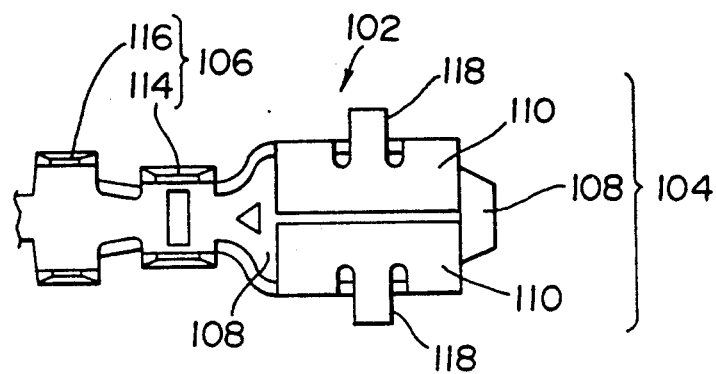
FIG. 6 is a plan view of the connecting terminal which connects the motor terminal and sheathed wire to each other.
Figure 7:
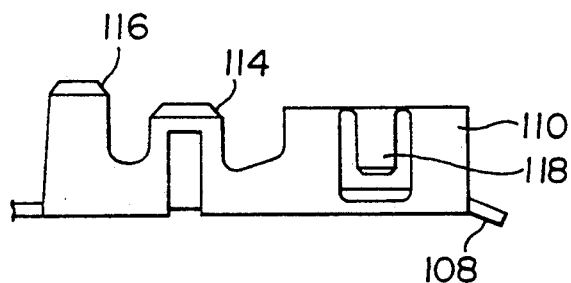
FIG. 7 is a side elevation of the connecting terminal in FIG. 6.
Figure 8:
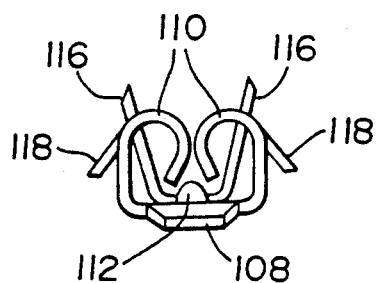
FIG. 8 is an end view of the connecting terminal in FIG. 6.

FIGS. 6 through 8 show in detail the connecting terminal 102. The connecting terminal 102 is formed from an electrically conductive metal such as phosphor bronze, etc. to have an elongated shape. It comprises a first portion of connection 104 to which the lead terminal extended from the motor is to be connected, and a second portion of connection 106 to which the conductor of the sheathed wire 70 is to be connected.

The first portion of connection 104 comprises a base 108 being so wide that the lead terminal extended from the motor can be inserted, a pair of gripping pieces 110 rising from opposite edges of the base 108 and of which the end portions are bent in a generally U shape, and a tongue cut in a part of the base 108 and raised a little from the base 108. The lead terminal extending from the motor is forcibly fitted in the narrow space defined by the pair of bent gripping pieces 110 and tongue 112, namely, the lead terminal extended from the motor is secured to the first portion of connection 104.

The second portion of connection 104 comprises a pair of gripping pieces 114 rising from opposite edges of the base 108 so as to grip the conductor of the sheathed wire, and another pair of gripping pieces 116 rising from opposite edges of the base 108 so as to grip the sheathed portion of the sheathed wire. The gripping pieces 114 and 116 are secured with the sheathed wire put on the base 108 and the sheathed wire is securely connected to the connecting terminals 102.

Figure 9:
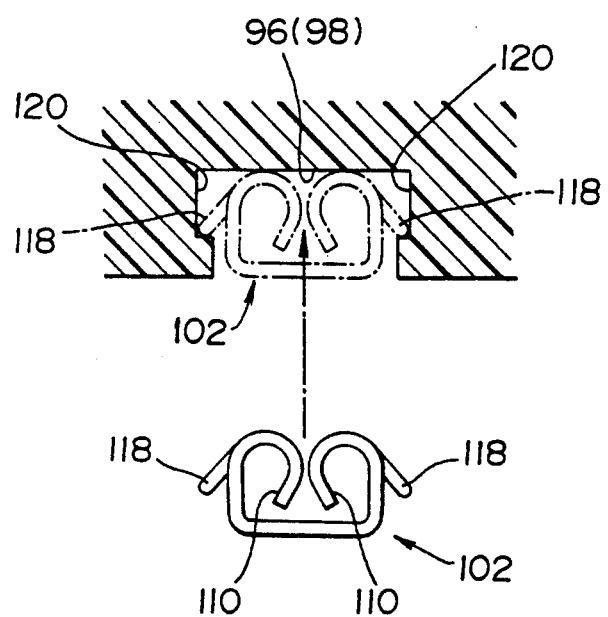
FIG. 9 is an explanatory drawing of the connecting terminal, showing the function thereof.

Further, a pair of engagement pieces 118 is formed by cutting a part of each of the gripping pieces 110 in pairs and raising them outward. These engagement pieces 118 thus, raised outward are so designed as to resiliently engage on the side walls of the elongated concavities 96 and 98 when the connecting terminals 102 are fitted into the concavities 96 and 98, respectively. The width and length of the elongated concavities 96 and 98 are slightly larger than those of the base 108 of the connecting terminal 102. A pair of engagement recesses 120 in which the engagement pieces 118 in pairs are engaged may be formed on the opposite side walls of the concavities, as shown in FIG. 9, to more securely fix the connecting terminals 102 in the concavities 96 and 98, respectively. In any case, when the connecting terminals 102 are fitted into the elongated concavities 96 and 98, respectively, the pair of engagement pieces 118 are forcibly fitted on the side walls of the concavities 96 and 98.

In this embodiment, the four connecting terminals 102 fixed in the concavities 96 and 98 are securely fixed with an adhesive tape 124 to the power unit 20.

The above-mentioned structure of electrical connection is assembled in practice as follows. First, the end of each of the four sheathed wires 70 is placed in place on each of the connecting terminals 102 beforehand. The conductor and sheath are securely joined to the connecting terminal 102 by crimping the pairs of gripping pieces 114 and 116. Thereafter, the two motors 22 and 24 are disposed in place in the upper casing 26 of the power unit 20. At this time, the pair of lead terminals 82 of the motor 22 and the pair of lead terminals 84 of the motor 24 are led out of the power unit 20 through the through-holes 92 and 94 formed in the upper casing 26 opposite to the corresponding lead terminals. After that, the four lead terminals protruding on the outer surface of the upper casing 26 are held generally vertically, and then the connecting terminal 102 is inserted into the lead terminal as shown in FIG. 4 in such a manner that the end of each lead terminal is forcibly fitted into a narrow space defined by the pair of bent gripping pieces 110 and tongue 112 of the connecting terminal 102 to which the sheathed wire 70 is already connected. Thus, the lead terminal extending from the motor is secured to the first portion of connection 104. Thereafter, the connecting terminals 102 are received in the elongated concavities 96 and 98, respectively, when the four lead terminals held vertically are bent at the open ends of the through-holes 92 and 94. At this time, the engagement pieces 118 formed by cutting and raising out in each connecting terminal 102 are forcibly fitted on the side walls of the engagement recesses 120 formed in the elongated concavities 96 and 98 as shown in FIG. 9. Thus the four sheathed wires 70 are securely fixed to the power unit 20.

What is claimed is:

1. A mirror drive unit, comprising:
   a plurality of motors, each with a plurality of lead terminals, for tilting a mirror supported pivotably inside a mirror housing about the horizontal and vertical axes thereof;
   a synthetic resin-made casing having upper and lower surfaces and housing the motors;
   a harness including a plurality of wires, connected to the casing, to supply electric power to the plurality of motors in the casing;
   said casing having formed therein a plurality of small through-holes through which the lead terminals of said plurality of motors directly extend from inside to outside thereof in a direction substantially perpendicular to one of the upper or lower surfaces of the casing and also having a plurality of small concavities formed on an outer surface thereof, said plurality of small concavities adjoining said through-holes;
   one end of each of said lead terminals of the plurality of motors, respectively, being exposed outside a through-hole and bent at an outside end of the through-hole at a substantially right angle so as to be received in an adjoining concavity; and
   a plurality of connecting terminals each having a plurality of gripping pieces to mechanically connect exposed ends of the plurality of lead terminals and the plurality of wires in said harness, said connecting terminals being forcibly fitted on side walls of said concavities.

2. A mirror drive unit as set forth in claim 1, wherein said connecting terminals further include a plurality of engagement pieces located on at least some of said plurality of gripping pieces and wherein said plurality of concavities includes a plurality of recesses formed in the side walls of said concavities, in which said engagement pieces are engaged.

3. A mirror drive unit, comprising:
   a plurality of motors, each with a plurality of lead terminals, for tilting a mirror supported pivotably inside a mirror housing about the horizontal and vertical axes thereof;
   a synthetic resin-made casing having upper and lower surfaces and housing the motors;
   a harness including a plurality of wires, connected to the casing, to supply electric power to the plurality of motors in the casing;
   said casing having formed therein a plurality of small through-holes through which the lead terminals of said plurality of motors directly extend from inside to outside thereof in a direction substantially perpendicular to one of the upper or lower surfaces of the casing and also having a plurality of small concavities formed on an outer surface thereof, said plurality of small concavities adjoining said through-holes;
   one end of each of said lead terminals of the plurality of motors, respectively, being exposed outside a through-hole and bent at an outside end of the through-hole at a substantially right angle so as to be received in an adjoining concavity; and
   a plurality of connecting terminals each having a plurality of gripping pieces to mechanically connect exposed ends of the plurality of lead terminals and the plurality of wires in said harness, said connecting terminals being forcibly fitted on side walls of said concavities;
   wherein said connecting terminals further include a plurality of engagement pieces located on at least some of said plurality of gripping pieces and wherein said plurality of concavities includes a plurality of recesses formed in the side walls of said concavities, in which said engagement pieces are engaged.

* * * * *